Figure 1:
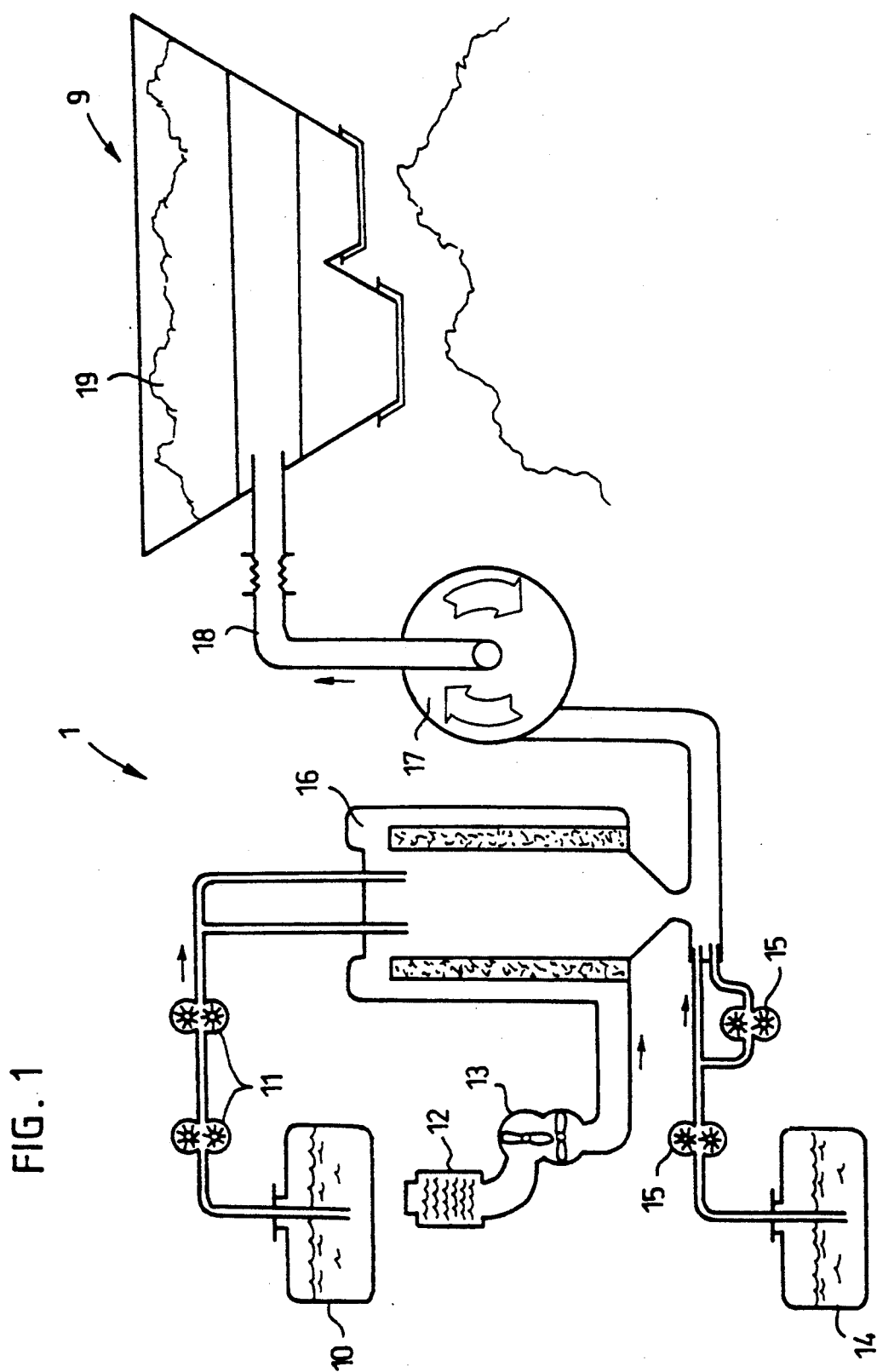

United States Patent [19]

Aho

[11] Patent Number: 5,277,710
[45] Date of Patent: Jan. 11, 1994

[54] METHOD OF PROCESSING AN ASPHALT MIXTURE

[76] Inventor: Seppo Aho, Rauhankatu 54, SF-96100 Rovaniemi, Finland

[21] Appl. No.: 961,929
[22] PCT Filed: Jul. 18, 1991
[86] PCT No.: PCT/FI91/00221
§ 371 Date: Feb. 19, 1993
§ 102(e) Date: Feb. 19, 1993
[87] PCT Pub. No.: WO92/01751
PCT Pub. Date: Feb. 6, 1992

[30] Foreign Application Priority Data

Jul. 23, 1990 [FI] Finland .................. 903698

[51] Int. Cl.$^5$ .............................................. C08L 95/00
[52] U.S. Cl. ............................ 106/273.1; 106/281.1
[58] Field of Search ........................ 106/273.1, 281.1

[56] References Cited

U.S. PATENT DOCUMENTS 4,519,711  5/1985  Gillen et al. .......................... 366/4
4,811,723  3/1989  Vaananen ............................ 126/113

FOREIGN PATENT DOCUMENTS 1041996  10/1958  Fed. Rep. of Germany .
3005183  8/1981  Fed. Rep. of Germany .
72592  2/1987  Finland .

Primary Examiner—Helene Klemanski
Attorney, Agent, or Firm—Ladas & Parry

[57] ABSTRACT

The object of the invention is a method of processing an asphalt mixture which comprises mineral aggregate and/or recycled crushed asphalt and to which bitumen-based binding material has optionally been added, the method comprising heating of mineral aggregate or a mixture of mineral aggregate and crushed asphalt or crushed asphalt as such before mixing the possible preheated bitumen-based binding material with the mixture. In the method according to the invention the mineral aggregate or crushed asphalt or a mixture thereof that has been disposed in hoppers (9) is heated by leading a heated gas that contains vapour, preferably superheated water vapour, thereto, the gas being preferably a dry mixed gas (water gas) of a combustion gas of fuel, such as thin oil, and water vapour.

5 Claims, 2 Drawing Sheets

METHOD OF PROCESSING AN ASPHALT MIXTURE

The invention relates to a method of processing an asphalt mixture which comprises mineral aggregate and/or recycled crushed asphalt and to which bitumen-based binding material has optionally been added, the method comprising heating of mineral aggregate or a mixture of mineral aggregate and crushed asphalt or crushed asphalt as such before mixing the possible preheated bitumen-based binding material with the mixture. In this application crushed asphalt refers to a mixture of bitumen and mineral aggregate.

It is conventional in the processing of an asphalt mixture as described above, i.e. a mixture which not only comprises mineral aggregate but optionally also recycled crushed asphalt, i.e. so-called recycling crush, or only such crush, as a starting material, that the starting material is heated in a drum directly by flame of a burner. Thereby the flame comes into contact with both the mineral aggregate and the crushed asphalt, whereby on the one hand dust is emitted from the mineral aggregate and above all noxious gases are emitted from the crushed asphalt, particularly from the bitumen therein. It is precisely because of the formation of noxious gases that this kind of conventional method is no longer allowed in most countries. However, in substitute methods a mixture comprising recycled crushed asphalt cannot very often be heated to temperatures that are sufficiently high for a successful mixture. Furthermore, several methods used nowadays involve abundant formation of dust when mineral aggregate is heated, whereby these methods require that expensive and efficient filters be used.

A method in which attempts have been made to minimize environmental hazards is known from U.S. Pat. No. 4,519,711. In the method crushed asphalt is heated by heated gases and flame in a drum mixer, and nowhere near complete elimination of dust and noxious gases forming thereby can be achieved by the curtains of water according to the publication.

The object of the present invention is to disclose a new method of processing an asphalt mixture in which the above problems have been successfully avoided. Thus in the method according to the invention even the possible crushed asphalt is successfully heated to a temperature that is sufficiently high for a successful mixture and on the other hand dusting of the mineral aggregate is avoided. This is achieved by the method according to the invention in such a way that mineral aggregate or a mixture of mineral aggregate and crushed asphalt or crushed asphalt as such is heated by leading a heated gas that comprises vapour, preferably superheated water vapour, thereto. Preferably, the temperature of the heated gas is within the range of about 250° to 350° C. By leading the heated gas from below to a mixture disposed in a hopper that is open from above, the mixture at the bottom of the hopper can be very efficiently heated to a temperature desired, whereby the mixture in the hopper functions as a heat insulator with respect to the surroundings. Thereby the coefficient of efficiency of the heating can also be made very high. The hopper is emptied in batches through the bottom thereof as the mixture at the bottom of the hopper reaches the temperature desired.

It is essential to the operation of the method according to the invention that the heated gas contains a quantity of vapour functioning as a heating medium, the vapour being preferably, but not necessarily, superheated water vapour, i.e. the gas is a so-called water gas. On account of this addition of water vapour the heat content of the gas is increased and, additionally, the gas obtains a property that inhibits formation of dust. Preferably, the heated gas is a dry mixed gas of a combustion gas of fuel, such as thin oil, and water vapour.

Preferably, the gas used in the method according to the invention is generated by a gas generator known from U.S. Pat. No. 4,811,723.

Figure 2:
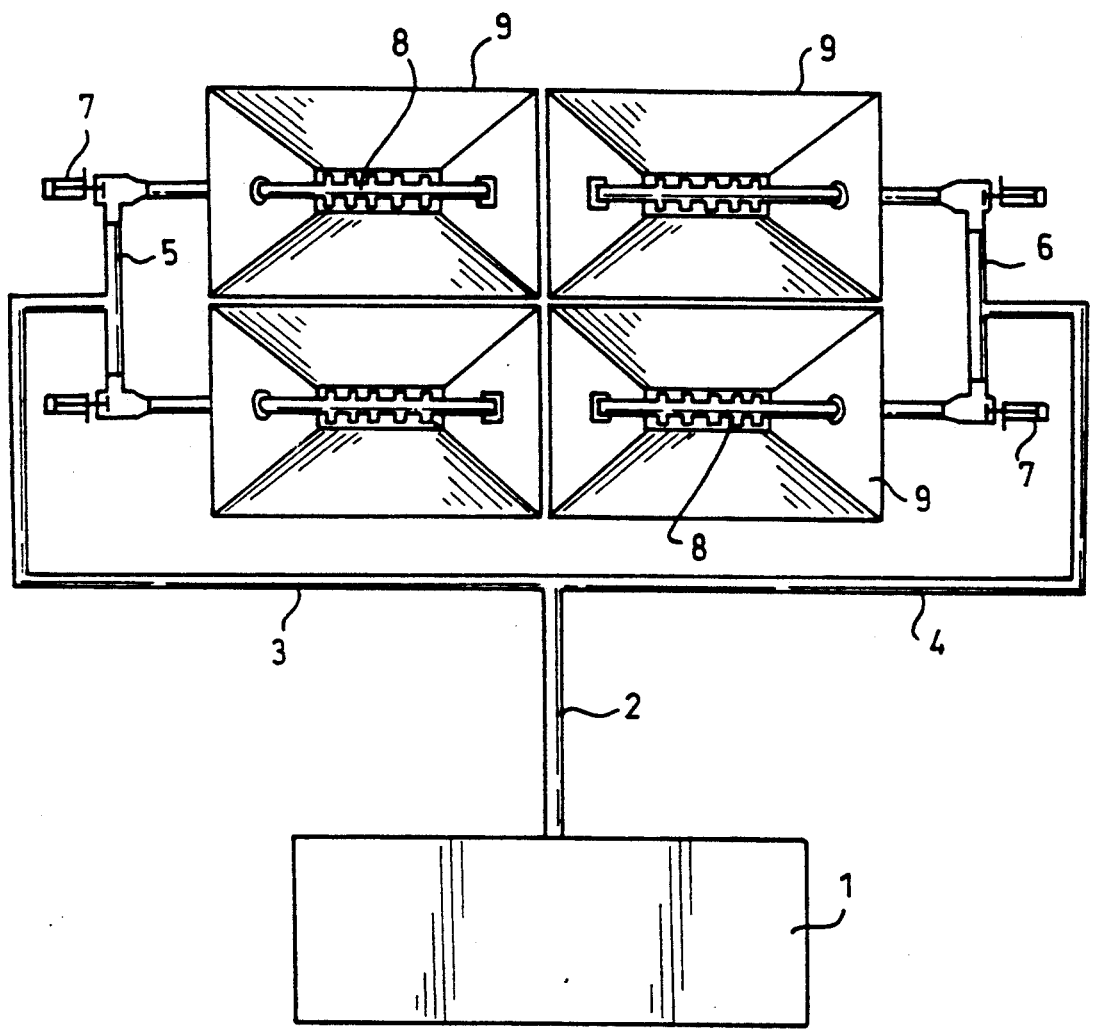

In the following the method according to the invention and the apparatus in which it can be applied are described in more detail with reference to the attached drawing, whereby FIG. 1 shows a schematic view of an apparatus utilizing the method according to the invention, and FIG. 2 shows in more detail a hopper structure contained in the apparatus according to FIG. 1 with a gas distributing pipe system attached thereto.

FIG. 1 shows a schematic view of an apparatus for carrying out the method according to the invention. The apparatus comprises a means 1 for generating a heated gas, the means preferably but not necessarily being a means similar to the one known from U.S. Pat. No. 4,811,723 and hoppers 9 for mineral aggregate or crushed asphalt or a mixture 19 thereof that is to be heated. The gas generating means 1 comprises a fuel tank 10 from which fuel is supplied to a combustion chamber 16 with pumps 11. Air obtained from an air intake 12 is likewise supplied to the combustion chamber 16 with a compressor 13. By proper proportioning of the operation of the fuel pumps 11 and the compressor 13 optimal combustion conditions are created in the combustion chamber, whereby the temperature may rise to as high as 1400° C. Water is sprayed with pumps 15 from a water tank 14 to combustion gases leaving the combustion chamber 16, whereby the water vaporizes in a vortex chamber evaporator 17 generating a water gas with a temperature of e.g. 350° C. The water gas is supplied essentially from below through a pipe 18 to a mixture 19 to be heated that has been disposed in the hoppers 9. Thereby the heat latent in the gas is effectively transferred to the mixture without emitting dust or, when crushed asphalt is heated, noxious gases The most essential reason for this is that the crushed asphalt is not heated by flame and very high temperatures that lead to gassing do thus not occur. The temperature of the gases leaving the mixture to be heated is only about 20° to 30° C. since the gases are forced to move through the entire hopper before they are released to the surroundings and they thus have time to emit their entire heat content to the mixture.

FIG. 2 shows a more detailed view of a gas distributing pipe system for the hoppers 9. The pipe system first comprises a main supply pipe 2 which receives the gas from the generator 1. The main pipe 2 divides into two manifolds 3 and 4 each of which in turn divides into two distributing branches 5 and 6. Each distributing branch has an end provided with a control valve 7 for distributing the gas to bypass manifolds 8 that supplies it to the hoppers 9. The structure according to the figure has four hoppers 9 and thus also four bypass manifolds 8. The manifolds 8 are situated at the lower portion of the hoppers and supply the heated gas evenly to the interior of the hopper, whereby the gas evenly heats the material supplied to the hopper. When the starting material has been heated in this manner to a temperature that is sufficiently high even with respect to the processing of a recycling mixture, the starting material is led to a mixer in which bitumen-based binding material that has been preheated to a liquid form, e.g. bitumen, a bitumen solution or bitumen emulsion, is mixed therewith to achieve a suitable bitumen content. It is pointed out that addition of bitumen is not absolutely necessary if the crushed asphalt in itself contains a sufficient quantity of bitumen for binding the mixture. The use of a recycling mixture is very beneficial in practice since significant amounts of mineral aggregate and bitumen are saved thereby, and since on the other hand the strength of the resultant paving is very high on account of the abundant mineral aggregate contained therein.

Although already in the heating of mineral aggregate the method according to the present invention has clear advantages as regards dustlessness and efficiency over conventional methods of heating mineral aggregate, by far the most surprising feature of the method according to the present invention is that even recycled crushed asphalt can be successfully heated by means of the heated mixed gas generated by the apparatus known from U.S. Pat. No. 4,811,723 in such a way that a temperature that is sufficiently high with respect to the processing of a recycling mixture is achieved in the crushed asphalt without the risk that a noxious so-called blue gas is formed. Precisely this avoiding of formation of a blue gas is one of the most essential advantages provided by the present invention. Another particularly essential advantage of the method according to the invention is that the costs of the apparatus for processing crushed asphalt that utilizes this method are only a fraction, perhaps about a third, of the costs of the apparatuses in which conventional methods are applied.

The method according to the invention has been described above only by way of example by means of one apparatus and it is to be understood that an apparatus carrying out the method could be very different from what has been described above. The most essential feature in the method according to the invention is that a starting material, which may contain mineral aggregate and/or recycled crushed asphalt, can now be heated without the risk of generating noxious gases. Furthermore, dusting of mineral aggregate can thereby be retained at a low level. Thereby a very simple method of processing an asphalt mixture leading to a very good result is achieved.

I claim:

1. A method of processing an asphalt mixture which comprises mineral aggregate and/or recycled crushed asphalt and to which bitumen-based binding material has optionally been added, the method comprising heating mineral aggregate or a mixture of mineral aggregate and crushed asphalt or crushed asphalt before mixing the optional preheated bitumen-based binding material with the mixture, by leading a heated gas that comprises water vapor, thereto.

2. A method according to claim 1, wherein the temperature of the heated gas is within the range of about 250° to 350° C.

3. A method according to claim 1, wherein the heated gas is a dry mixed gas (water gas) of a combustion gas of fuel, and water vapor.

4. A method according to claim 1, wherein the water vapor is superheated water vapor.

5. A method according to claim 3, wherein the combustion gas of fuel is thin oil.

* * * * *